United States Patent
Smallin

(10) Patent No.: US 8,355,295 B1
(45) Date of Patent: Jan. 15, 2013

(54) UNDERWATER MOBILE SENSING/COMMUNICATIONS NODE AND NETWORK OF SUCH NODES

(75) Inventor: Bryan J. Smallin, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 98 days.

(21) Appl. No.: 12/807,377

(22) Filed: Aug. 19, 2010

(51) Int. Cl.
*H04B 11/00* (2006.01)

(52) U.S. Cl. ......................... 367/134; 367/131

(58) Field of Classification Search .................. 367/131, 367/134

See application file for complete search history.

(56) References Cited

U.S. PATENT DOCUMENTS

| | | | | |
|---|---|---|---|---|
| 3,811,379 A * | 5/1974 | Sondheimer | ................ | 102/413 |
| 4,371,957 A * | 2/1983 | Sandoz et al. | ................ | 367/3 |
| 5,487,350 A * | 1/1996 | Chace et al. | ................ | 114/330 |
| 5,490,473 A * | 2/1996 | Chace et al. | ................ | 114/330 |
| 5,525,081 A * | 6/1996 | Mardesich et al. | ................ | 440/6 |
| 5,537,947 A * | 7/1996 | Couture et al. | ................ | 114/20.1 |
| 5,666,900 A * | 9/1997 | Carroll et al. | ................ | 114/316 |
| 5,894,450 A * | 4/1999 | Schmidt et al. | ................ | 367/134 |
| 2006/0280034 A1 * | 12/2006 | Howard et al. | ................ | 367/134 |
| 2007/0203623 A1 * | 8/2007 | Saunders et al. | ................ | 701/23 |
| 2007/0297290 A1 * | 12/2007 | Vosburgh et al. | ................ | 367/131 |
| 2010/0067331 A1 * | 3/2010 | Yang | ................ | 367/134 |

* cited by examiner

*Primary Examiner* — Isam Alsomiri
*Assistant Examiner* — James Hulka
(74) *Attorney, Agent, or Firm* — James T. Shepherd

(57) ABSTRACT

An underwater sensing and communications node includes an underwater vehicle, target sensing capability mounted on a forward portion of the underwater vehicle, at least three passive acoustic sensors evenly distributed about a first circumferential region of the underwater vehicle, and at least three transceiving hydrophones evenly distributed about a second circumferential region of the underwater vehicle. A controller governs collection of sensed data and transmission of the sensed data into the underwater environment.

6 Claims, 3 Drawing Sheets

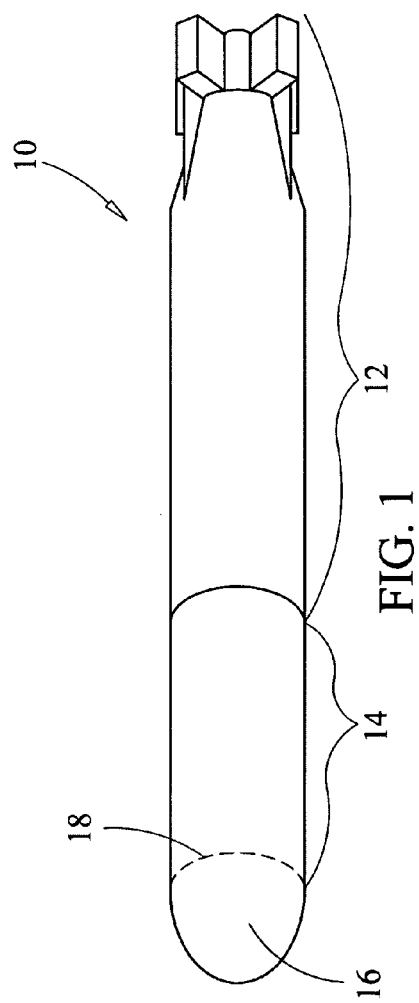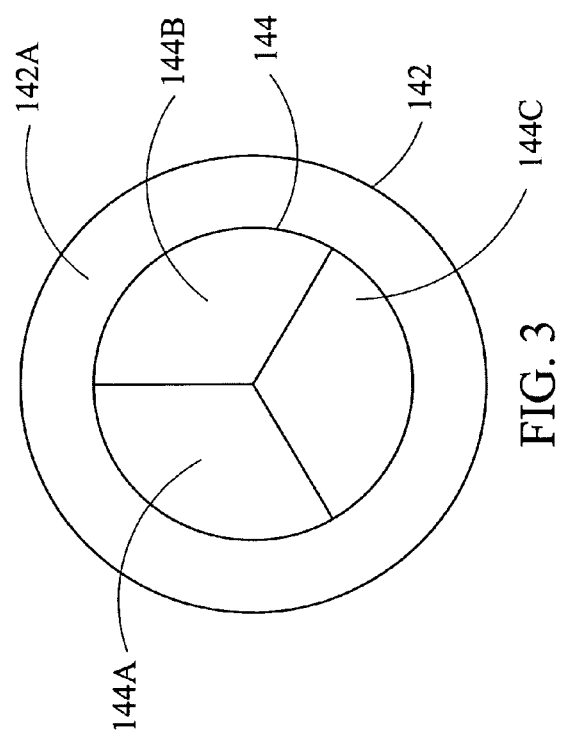

UNDERWATER MOBILE SENSING/COMMUNICATIONS NODE AND NETWORK OF SUCH NODES

ORIGIN OF THE INVENTION

The invention described herein may be manufactured and used by or for the Government of the United States of America for Governmental purposes without payment of any royalties thereon or therefore.

FIELD OF THE INVENTION

The invention relates generally to underwater sensing and communications, and more particularly to a mobile platform that can perform a variety of underwater sensing operations and then wirelessly transmit the sensed data underwater.

BACKGROUND OF THE INVENTION

The monitoring and tracking of ships and submarines in ports and waterways is a concern for both security and naval forces. Such monitoring and tracking is especially difficult or impossible when the ports/waterways are under the control of an enemy. In these cases, it is tactically dangerous to send in divers who will emplace sensors in strategic locations. Even if the sensors can be placed, the data sensed thereby must still be communicated back to a command station for evaluation.

SUMMARY OF THE INVENTION

Accordingly, it is an object of the present invention to provide a system for sensing underwater conditions related to target surveillance.

Another object of the present invention is to provide a system that positions remote sensing stations on a seafloor, collects data on the surrounding underwater environment, and then transmits the sensed data to a location that is remote with respect to the remote sensing stations.

Other objects and advantages of the present invention will become more obvious hereinafter in the specification and drawings.

In accordance with the present invention, an underwater sensing and communications node includes an underwater vehicle for immersion in an underwater environment. A target sensing structure is mounted on a forward portion of the underwater vehicle. At least three passive acoustic sensors are evenly distributed about a first circumferential region of the underwater vehicle. At least three transceiving hydrophones are evenly distributed about a second circumferential region of the underwater vehicle. A controller is coupled to the target sensing structure, the passive acoustic sensors and the transceiving hydrophones. The controller governs collection of sensed data from the target sensing structure and passive acoustic sensors, and transmission of the sensed data into the underwater environment via the transceiving hydrophones.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a perspective view of an underwater mobile sensing/communications node in accordance with an embodiment of the present invention;

FIG. 3 is an end and part schematic view of an embodiment of the sensing portion of the node residing on the seafloor.

DETAILED DESCRIPTION OF THE INVENTION

Figure 2:
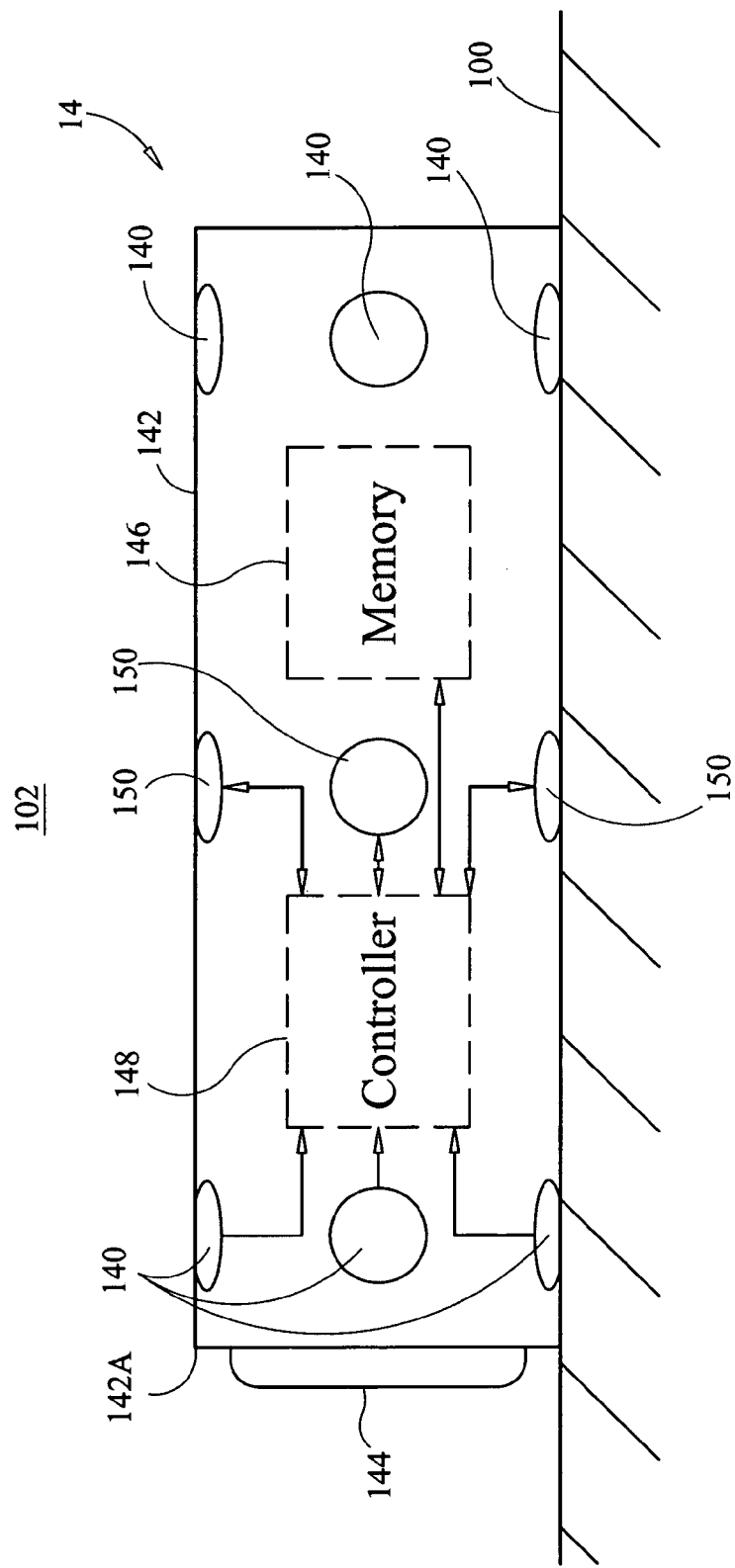
FIG. 2 is an isolated side and part schematic view of an embodiment of the sensing portion of the node residing on a seafloor.

Referring now to the drawings and more particularly to FIG. 1, an underwater mobile sensing and communication node in accordance with an embodiment of the present invention is shown and is referenced by numeral 10. As will be explained further below, node 10 is used to transport a suite of sensors to a location on a seafloor. From this location, node 10 provides underwater surveillance in the vicinity of node 10, and also provides for the wireless underwater transmission of the surveillance data.

By way of example, node 10 can be an autonomous underwater vehicle that is configured to be launched from existing surface ship or submarine launch facilities. More specifically, an exemplary embodiment of node 10 is constructed by modification of an existing configuration of a submarine launched mobile mine (e.g., the U.S. Navy's MK 67). An existing main assembly 12 includes propulsion, navigation and hydrodynamic control systems that allow node 10 to "swim" to a desired location on a seafloor. Such propulsion, navigation and hydrodynamic control systems are well known in the art and do not comprise part of or are a limitation on the present invention.

Coupled to the forward portion of main assembly 12 is a sensor assembly 14. For example, in terms of the aforementioned MK 67 example, sensor assembly 14 can be configured to replace the forward explosive section of the MK 67 such that sensor assembly 14 readily attaches to the forward portion of main assembly 12. To protect sensor assembly 14 during handling and travel to its "on station" location on a seafloor, a nose cone 16 can be coupled to the forward portion of sensor assembly 14. As will be explained further below, some of the sensors in sensor assembly 14 could be placed behind nose cone 16. Accordingly, it may be necessary to separate nose cone 16 from sensor assembly 14 once node 10 is on station. To accomplish this, nose cone 16 must be releasably coupled to sensor assembly 14 as indicated in the drawing by dashed lines 18. Separation of nose cone 16 from sensor assembly 14 could be realized by the detonation of small charges, a mechanical separation system, an electromechanical separation system, etc., the choice of which is not a limitation of the present invention.

Referring additionally now to FIGS. 2 and 3, an embodiment of sensor assembly 14 is illustrated in isolation from the remaining portions of node 10. Sensor assembly 14 is illustrated as it might appear when it is in positioned on a seafloor 100 of an underwater environment 102. Referring first to FIG. 2, a plurality of acoustic sensors 140 are provided on exterior regions of the casing 142 of assembly 14. Each of acoustic sensors 140 is an underwater passive acoustic sensor, a variety of which are known and available in the art. In the illustrated embodiment, four acoustic sensors 140 are distributed evenly (i.e., 90° of separation therebetween) about the circumference of casing 142. In this way, there will always be a plurality of such sensors for sensing above and on either side of sensor assembly 14 regardless of how sensor assembly 14 is oriented on seafloor 100. While four acoustic sensors 140 are provided about a circumferential region of casing 142, three or more than four such sensors could be so distributed. For example, if three acoustic sensors were used, each adjacent pair would be separated by 120°. For redundancy, an additional circumferential region of evenly-distributed sensors 140 could be provided as illustrated.

Mounted on the forward portion 142A (i.e., where nose cone 16 would be attached as described above) of casing 142 is a set 144 of sensors that are configured to sense changing characteristics of underwater environment 102 where such changes are indicative of the presence of a possible target of interest. For example and as illustrated schematically in FIG. 3, set 144 can include magnetic sensor(s) 144A, seismic sensor(s) 144B, and pressure sensors 144C. The particular number, type, and arrangement of the sensors in set 144 can be tailored to satisfy the requirements of a particular application.

The data sensed by acoustic sensors 140 and the sensors in set 144 can be stored onboard sensor assembly 14 using a memory 146 (illustrated by dashed lines to indicate its inclusion within casing 142). Control of the sensors and power for the sensors can be provided by an onboard controller 148, which can be a single controller or multiple controllers without departing from the scope of the present invention. Controller 148 provides the general structure for collecting the sensed data and passing it to memory 146, which can be separate from controller 148 or incorporated therein. For clarity of illustration, control lines are only shown for three sensors 140 in one circumferential region of casing 142.

Sensor assembly 14 is also capable of transmitting the sensed data wirelessly into/through underwater environment 102. To do this, a plurality of acoustic communication hydrophones 150 is distributed evenly about a circumferential region of casing 142. Similar to acoustic sensors 140, it is desirable for hydrophones 150 to be able to transmit an acoustic signal above and to either side of sensor assembly 14 regardless of how sensor assembly 14 is oriented on seafloor 100. While four hydrophones 150 are provided with 90° of separation therebetween, the present invention could use three or more than four evenly-distributed hydrophones. For reasons that will be explained further below, each hydrophone is capable of transmitting acoustic data into the water and receiving acoustic data therefrom. Control of hydrophones 150 is also provided by controller 148.

Figure 4:
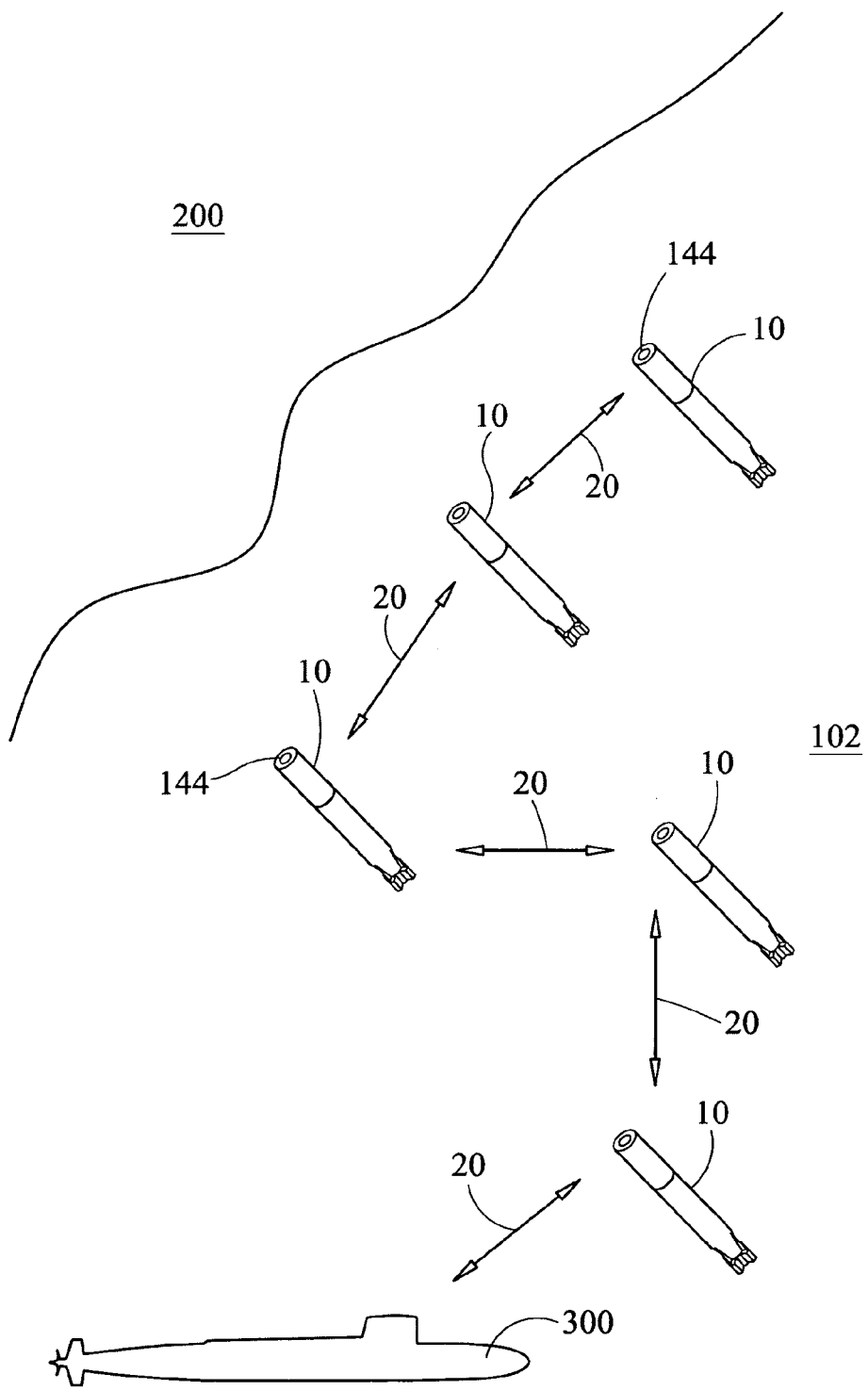
FIG. 4 is a plan view of a network of sensing/communication nodes in an underwater environment in accordance with an embodiment of the present invention.

For many applications, it will be desirable to deploy a number of the above-described nodes into an underwater region of interest. By way of example, FIG. 4 illustrates a network of nodes 10 deployed near a shore 200. It is assumed that each of nodes is resting on seafloor 102 and is sensing various forms of data as described above. The sensed data can be stored locally at each node 10 until the transmission thereof is requested or scheduled. Each of nodes 10 could "tag" its sensed data with a node identifier and node location. The sensed data can then be transmitted into the water, received by a nearby node 10, and then relayed onto another nearby node 10. The relaying of node data can continue between nodes 10 until all node data reaches a remotely-located command vessel 300. Such relaying of node data via underwater acoustic transmission is indicated by two-headed arrows 20.

The advantages of the present invention are numerous. One or more sensing/communication nodes can be deployed at a location without the use of dive personnel. Once in place, each node senses and transmits surveillance data. By using a network of such nodes, an underwater region can be monitored in a wireless fashion. Each node provides sensing and communication redundancy. A network of nodes provides surveillance capability even if an individual node fails.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An underwater sensing and communications node, comprising:
   a submarine-launched underwater vehicle for travel to and stationing on a seafloor of an underwater environment;
   a target sensing structure mounted on a forward portion of said underwater vehicle for sensing changes in the underwater environment, said target sensing structure including at least one magnetic sensor, at least one seismic sensor, and at least one pressure sensor;
   a protective nose releasably coupled to said forward portion of said underwater vehicle and covering said target sensing structure;
   at least three passive acoustic sensors evenly distributed about a first circumferential region of said underwater vehicle;
   at least three transceiving hydrophones evenly distributed about a second circumferential region of said underwater vehicle; and
   a controller coupled to said target sensing structure, said passive acoustic sensors and said transceiving hydrophones, for collecting sensed data from said target sensing structure and said passive acoustic sensors after said protective nose is released from said underwater vehicle so-stationed on the seafloor, and for transmitting said sensed data into the underwater environment via said transceiving hydrophones.

2. An underwater sensing and communications node as in claim 1, wherein said transceiving hydrophones receive remotely-generated data from the underwater environment, said controller further transmitting said remotely-generated data back into the underwater environment via said transceiving hydrophones.

3. An underwater sensing and communications node as in claim 1, further comprising a data store coupled to said target detection structure and said passive acoustic sensors for storing said sensed data.

4. An underwater sensing and communications node-based network, comprising:
   a plurality of nodes dispersed on a seafloor of an underwater environment, each of said nodes including:
      an underwater vehicle configured to be launched from a submarine,
      a target sensing structure mounted on a forward portion of said underwater vehicle for sensing changes in the underwater environment, said target sensing structure including at least one magnetic sensor, at least one seismic sensor, and at least one pressure sensor,
      a protective nose releasably coupled to said forward portion of said underwater vehicle and covering said target sensing structure;
      at least three passive acoustic sensors evenly distributed about a first circumferential region of said underwater vehicle, at least three transceiving hydrophones evenly distributed about a second circumferential region of said underwater vehicle, and a controller coupled to said target sensing structure, said passive acoustic sensors and said transceiving hydrophones, for collecting sensed data from said target sensing structure and said passive acoustic sensors, and for transmitting said sensed data into the underwater environment via said transceiving hydrophones.

5. An underwater sensing and communications node-based network as in claim 4, wherein said transceiving hydrophones associated with one of said nodes receive said sensed data that has been transmitted into the underwater environment from at least one other of said nodes, said controller further transmitting said sensed data from said at least one other of said nodes back into the underwater environment via said transceiving hydrophones associated with said one of said nodes.

6. An underwater sensing and communications node-based network as in claim 4, further comprising a data store maintained on each said underwater vehicle and coupled to said target detection structure and said passive acoustic sensors associated therewith for storing said sensed data.

* * * * *